United States Patent [19]

Hess

[11] Patent Number: 4,937,103

[45] Date of Patent: Jun. 26, 1990

[54] SCRATCH A SKETCH

[76] Inventor: Suzanne M. Hess, P. O. Box 10204, Erie, Pa. 16514

[21] Appl. No.: 192,937

[22] Filed: May 12, 1988

[51] Int. Cl.$^5$ .............................................. B05D 5/00
[52] U.S. Cl. ...................................... 427/269; 264/62; 264/67; 427/264; 427/270
[58] Field of Search ..................... 264/62, 67; 427/264, 427/269, 270

[56] References Cited

U.S. PATENT DOCUMENTS

| 1,790,918 | 2/1931 | Hauser | 264/62 |
| 2,174,198 | 9/1939 | Schramm | 264/62 |
| 4,263,734 | 4/1981 | Bradshaw | 264/62 |

FOREIGN PATENT DOCUMENTS 1004304  9/1965  United Kingdom .................. 264/67

OTHER PUBLICATIONS

Jackson, George, Introduction to Whitewaves, Maclaren & Sons, London, 1969, pp. 128-129.

Primary Examiner—James Derrington
Attorney, Agent, or Firm—Ralph Hammar

[57] ABSTRACT

A colored coating soft fired on a ceramic base is scratched to remove the coating where scratched to produce a picture or design which is preserved by hard firing and glazing.

3 Claims, 1 Drawing Sheet

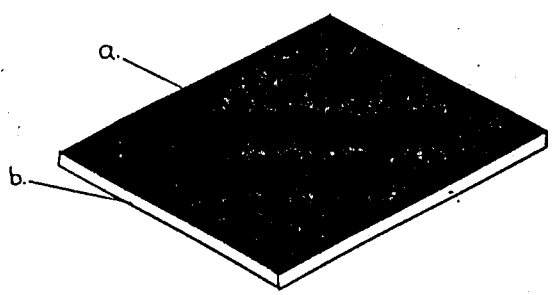
Fig. 1.
Fig. 8
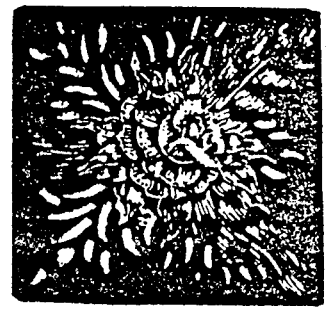
Fig. 2.
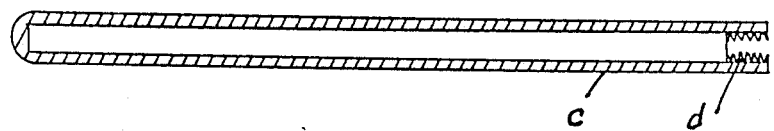
Fig. 3. Fig. 4.
 
Fig. 5.
Fig. 6. Fig. 7.
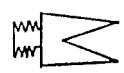 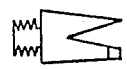

SCRATCH A SKETCH

This invention is a method and apparatus for making designs or pictures by scratching away selected portions of a colored coating on a ceramic blank.

In the drawing,

FIG. 1 is a perspective of a color coated ceramic blank,

FIG. 2 is a holder for the scratching tools shown in FIGS. 3 to 7 inclusive and

FIG. 8 is a plan view of a finished design or picture scratched into the colored coating of the ceramic blank.

In the preparation of the blank, the surface of the green ceramic blank b which is to carry the picture or design is cleaned, sanded, dusted and soft fired to cone 0.018–0.019 to open the pores in the ceramic and allow the sprayed-on color b to soak in and provide a good bond between the ceramic and color. Good results have been obtained using a One-Stroke color diluted half and half with water and applied with an airbrush. From six to eight coats may be applied allowing each coat to dry before applying the next coat. The ceramic blank is then soft fired again to cone 0.018–0.019 to harden the paint sufficiently so that the paint will not rub off and still be soft enough so the paint can be scratched off without flaking and without applying much pressure. If the color starts to rub off, fire the blank to cone 0.03–0.04. This will make scratching more difficult. The scratches expose the light color of the underlying ceramic which contrasts with the medium to very dark color of the paint coating. After the design is completed, the piece is hard fired to cone 0.03–0.04 and then glazed and fired to cone 0.05–0.06. Three coats of glaze before firing are recommended. Color absorbs more glaze than the ceramic. The glaze makes the design permanent.

The tools for making the design of FIG. 8 consist of the pencil-like holder (FIG. 2), a small sleeve c having a female threaded socket d at one end for receiving the male thread of any of the tips shown in FIGS. 3 to 7. Each of the tips has a sharpened point or chiseled edge which produces the desired type of scratch.

It is preferable to start with a full size drawing of the design or picture and to transfer the outline and essential features of the drawing to the blank by transfer paper and to begin scratching by going over the lines transferred from the drawing. Detail scratching should be started in the highlighted areas where scratches (lines or dots) are close together and to fade out toward darker areas where the scratches are widely spaced.

I claim:

1. The method of making a design or picture which comprises the steps of soft firing a green ceramic base, coating a surface of this base with a ceramic paint of color contrasting with the color of the base, soft firing the color coated ceramic, transferring by transfer paper the outline and essential features of a drawing of the design or picture to the coating, scratching through the color coating to expose said surface of the base at the bottoms of the scratches with a drawing pencil-like tool having sharpened points or chiseled edges which produce the desired type of scratch, the scratches (selected from the group consisting of lines and dots) being close together in highlighted areas and fading out toward darker areas where the scratches are widely spaced, and hard firing a glaze to the scratched surface.

2. The method of claim 1 in which before coating, the base is cleaned, sanded and dusted.

3. The method claim 2 in which the glazing is preceded by hard firing to set the scratched surface.

* * * * *